United States Patent Office 2,861,985
Patented Nov. 25, 1958

2,861,985

DISAZO DYESTUFFS

Hans Ischer and Lukas Schneider, Basel, Switzerland, assignors, by mesne assignments, to Saul & Co., Newark, N. J., as nominee of Fidelity Union Trust Company, executive trustee under Sandoz Trust No Drawing. Application March 30, 1955
Serial No. 498,109

Claims priority, application Switzerland
December 24, 1952

8 Claims. (Cl. 260—147)

The present invention is a continuation-in-part application of the co-pending application Ser. No. 398,869, filed on December 17, 1953 (now abandoned), and relates to new copperable disazo dyestuffs and to the copper and nickel complex compounds thereof.

The new disazo dyestuffs correspond in the metal-free form to the general formula

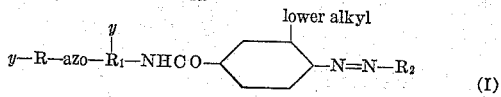
(I)

wherein one $y$ stands for —OH, the other $y$ being —OH, —OCH$_3$, —OCH$_2$COOH or —COOH, $y$—R stands for a radical of the benzene, naphthalene or pyrazolone series, the $y$ of $y$—R being in ortho-position to -azo-, $y$—R$_1$ stands for a radical of the benzene series, the $y$ of $y$—R$_1$ being in ortho-position to -azo-, and wherein R$_2$ stands for a radical chosen from radicals of hydroxybenzenes, hydroxynaphthalenes and aliphatic and heterocyclic hydroxy compounds which by reason of their containing an enol grouping are capable of coupling.

The new disazo dyestuffs are prepared by coupling one mol of the diazo compound of an aminomonoazo dyestuff of the formula

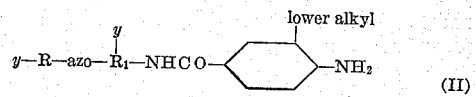
(II)

wherein $y$, $y$—R and $y$—R$_1$ have the previously-recited significances, the $y$ of $y$—R and the $y$ of $y$—R$_1$ being in ortho-position to -azo-, with one mol of a coupling compound of the hydroxybenzene or hydroxynaphthalene series or an aliphatic or heterocyclic hydroxy compound which by reason of its containing an enol grouping is capable of coupling, and, if desired, treating the resultant disazo dyestuff in substance or on the fiber with a copper- or nickel-yielding agent. In lieu of dyestuff (II), the corresponding coppered or nickeled product may be used.

A series of disazo dyestuffs obtainable according to the aforesaid first process embodiment of the present invention can also be obtained by coupling one mol of the diazo compound of an aminomonoazo dyestuff of the formula

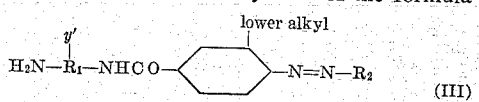
(III)

wherein R$_2$ has the precedingly-indicated significance, and $y'$—R$_1$ stands for a radical of the benzene series, the $y'$ being in ortho-position to —NH$_2$ and standing for —OH, —OCH$_3$, —OCH$_2$COOH or —COOH, with a compound of the hydroxybenzene, the hydroxynaphthalene or pyrazolone series which couples in ortho-position to the hydroxyl group, and here again, if desired, treating the resultant disazo dyestuff in substance or on the fiber with a copper- or nickel-yielding agent.

The preparation of the new disazo dyestuffs according to the first aforesaid process embodiment is advantageously carried out by diazotizing the aminomonoazo dyestuffs of the Formula II in indirect manner. To this end, the dyestuffs are dissolved in water, the requisite quantity of sodium nitrite added to the solution, and the latter adjusted to distinct mineral acidity by means of hydrochloric acid. The coupling of the obtained diazo compounds with the coupling compounds of the hydroxybenzene or hydroxynaphthalene series or aliphatic or heterocyclic hydroxy compounds which by reason of their containing an enol grouping are capable of coupling, is advantageously carried out in alkaline medium.

The coupling of the diazo compounds of Formula III with the compounds of the hydroxybenzene, hydroxynaphthalene or pyrazolone series which couple in ortho-position to the hydroxyl group, according to the aforesaid second process embodiment, is advantageously carried out in alkaline medium, if desired, in the presence of pyridine or other similarly-acting organic bases.

The disazo dyestuffs obtained according to the first process embodiment are obtained as copper or nickel complex compounds or, like the products obtained according to the second process embodiment, contain a metallizable ortho - ortho' - dihydroxy - azo- or ortho - hydroxy-ortho' - methoxy - azo- or ortho - hydroxy - ortho' - carboxy - azo or ortho - hydroxy - ortho' - carboxymethoxy-azo grouping. The metallizing of the disazo dyestuffs on the fiber may be carried out according to a single bath process or according to an aftermetallizing process. The metallizing in substance may be carried out by heating the dyestuffs with copper or nickel salts in weakly acid to alkaline medium, if desired, under pressure and/or in the presence of ammonia or organic bases or in a fusion of alkali metal salts of low molecular aliphatic carboxylic acids. If one of the substituents capable of copper or nickel complex formation is the methoxy group, then the metallizing is advantageously carried out with splitting of this group.

The aminomonoazo dyestuffs of Formula II, employed in the first process embodiment, can for example be obtained by condensing amines of the formula

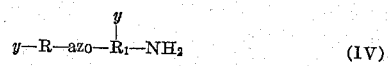
(IV)

wherein $y$, $y$—R and $y$—R' have the precedingly-recited significances, with 3-lower alkyl-4-nitrobenzene-1-carboxylic acid halides to produce the corresponding 3-lower alkyl-4-nitrobenzene-1-carboxylic acid amides, and then converting the nitro groups into amino groups by reduction.

The diazo compounds of the aminomonoazo dyestuffs of Formula III, employed in the preparation of the disazo dyestuffs according to the second process embodiment, can be prepared, for example, by tetrazotizing diamines of the formula

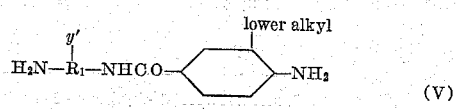
(V)

wherein $y'$ and $y'$—R$_1$ have the previously-indicated significances, followed by coupling of the so-obtained tetrazo compounds on one side with the coupling compounds of the hydroxybenzene or hydroxynaphthalene series or aliphatic or heterocyclic hydroxy compounds which by reason of their containing an enol grouping are capable of coupling. This coupling is advantageously carried out in weakly alkaline or acid medium.

The disazo dyestuffs metallized in substance according to the present invention, as well as the disazo dyestuffs which have been metallized on the fiber, yield, on cotton and fibers of regenerated cellulose, relatively vivid yellowish to bluish red shades of good fastness to light and to washing. The fastness properties of many of the dyeings prepared with the disazo dyestuffs of the present invention can also be improved by an aftertreatment, carried out in the presence of salts of bivalent copper, with polymeric compounds containing imino or amino groups, such as are disclosed for example in U. S. Patent No. 2,622,075 of December 16, 1952.

The following examples further illustrate the invention without, however, limiting the same; in these examples, the parts and percentages are by weight and the temperatures are in degrees centigrade.

EXAMPLE 1

51.2 parts of the monosodium salt of the aminomonoazo dyestuff—obtained by acid coupling of diazotized 1-hydroxy-2-amino-6-chlorobenzene-4-sulfonic acid with 1-methoxy-3-aminobenzene, acylation of the resultant aminomonoazo compound with 3-methyl-4-nitrobenzene-1-carboxylic acid chloride, and reduction of the nitro group to the amino group—are dissolved in 900 parts of water. 24 parts of aqueous sodium nitrite solution of 30% strength are added to the solution, which is then cooled by means of ice to a temperature of 5°, after which 40 parts of hydrochloric acid of 30% strength are quickly run in. After stirring for three hours at a temperature of 10–15°, diazotization is ended; the resultant suspension is then combined in the presence of aqueous sodium carbonate with an aqueous solution of 32 parts of the sodium salt of 2-acetylamino-5-hydroxynaphthalene-7-sulfonic acid. The new disazo dyestuff is formed instantaneously. It is precipitated from the warm solution by means of sodium chloride and is then filtered off and dried. It is a dark powder which dissolves with red coloration in water and with bluish red coloration in concentrated sulfuric acid.

In order to convert the said dyestuff into its copper complex compound, 82.6 parts of the disodium salt of the disazo dyestuff are dissolved in 2000 parts of water. To the resultant solution, there are gradually added at 90° 250 parts of an ammoniacal copper oxide solution, containing 25 parts of crystalline copper sulfate and 45 parts of aqueous ammonia solution of 25% strength. The mass is then heated to boiling and maintained at this temperature under reflux for six hours. The thus-prepared copper-containing disazo dyestuff is precipitated from the metallizing solution by means of sodium chloride and is then filtered off and dried. It corresponds to the formula

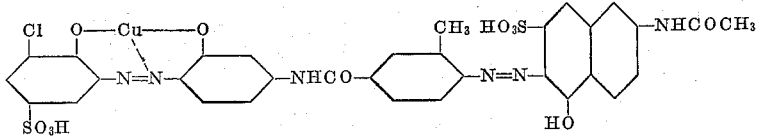

and dyes cotton and fibers of regenerated cellulose in red shades with good fastness to light and to washing.

EXAMPLE 2

82.6 parts of the disodium salt of the unmetallized disazo dyestuff described in Example 1 are run into a molten mixture at 60° of 900 parts of crystalline sodium acetate, 100 parts of diethanolamine, 100 parts of water and 30 parts of crystalline nickel sulfate. The mass is heated to 110–115° in the course of 1 hour and maintained at this temperature for 16 hours. The nickel-containing disazo dyestuff thus obtained is precipitated from the still warm mass by the addition of a 10% sodium chloride solution and subsequently filtered and dried. It corresponds to the formula

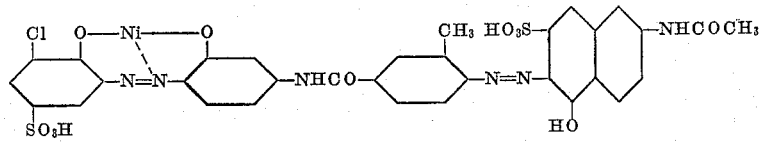

and dyes cotton and fibers of regenerated cellulose in bright red shades of good fastness to light and washing.

Table 1, which follows, sets forth additional metal-containing disazo dyestuffs which can be prepared after the manner described in Examples 1 or 2 and which possess properties similar to the product of Examples 1 and 2. They correspond in the metal-free form to the formula

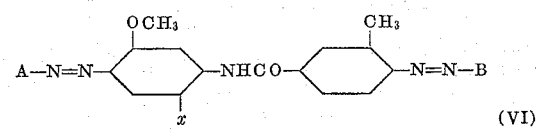

wherein symbols A and B represent the radicals set forth in the table and $x$ represents the enumerated substituents.

*Table 1*

| Example No. (1) | A=Radical of— (2) | B=Radical of— (3) | $x=$ (4) | Metal (5) | Shade of Dyeing on Cotton (6) |
|---|---|---|---|---|---|
| 3 | 1-hydroxy-2-amino-6-chlorobenzene-4-sulfonic acid. | 2-benzoylamino-5-hydroxynaphthalene-7-sulfonic acid. | —H | Cu | Red. |
| 4 | ----do---- | 2-carbethoxyamino-5-hydroxynaphthalene-7-sulfonic acid. | —H | Cu | Do. |
| 5 | ----do---- | 2-(4'-fumarylamino)-benzoylamino-5-hydroxynaphthalene-7-sulfonic acid. | —H | Cu | Do. |
| 6 | 1-hydroxy-2-amino-4-chlorobenzene-6-sulfonic acid. | 2-acetylamino-5-hydroxynaphthalene-7-sulfonic acid. | —H | Ni | Do. |
| 7 | 1-hydroxy-2-aminobenzene-4-sulfonic acid. | 2-benzoylamino-5-hydroxynaphthalene-7-sulfonic acid. | —H | Cu | Do. |
| 8 | ----do---- | 1-chloro-2-benzoylamino-5-hydroxynaphthalene-7-sulfonic acid. | —H | Cu | Do. |
| 9 | ----do---- | 2-(4'-acetylamino)-benzoylamino-5-hydroxynaphthalene-7-sulfonic acid. | —H | Cu | Do. |
| 10 | 1-hydroxy-2-aminobenzene-4-sulfonic acid-(2'-carboxy)-phenylamide. | 2-benzoylamino-5-hydroxynaphthalene-7-sulfonic acid. | —H | Cu | Do. |
| 11 | 1-hydroxy-2-amino-6-chlorobenzene-4-sulfonic acid. | 2-acetylamino-5-hydroxynaphthalene-7-sulfonic acid. | —CH$_3$ | Ni | Do. |

| Example No. (1) | A=Radical of— (2) | B=Radical of— (3) | x= (4) | Metal (5) | Shade of Dyeing on Cotton (6) |
|---|---|---|---|---|---|
| 12 | 1 - hydroxy - 2 - aminobenzene - 4 - sulfonic acid. | 2 - benzoylamino - 5 - hydroxynaphthalene - 7 - sulfonic acid. | —CH$_3$ | Cu | Red. |
| 13 | ....do.... | 1 - chloro - 2 - acetylamino - 5 - hydroxynaphthalene - 7 - sulfonic acid. | —CH$_3$ | Cu | Do. |
| 14 | ....do.... | 2 - acetylamino - 5 - hydroxynaphthalene - 7 - sulfonic acid. | —OCH$_3$ | Cu | Bordeaux-red. |
| 15 | 1 - hydroxy - 2 - aminobenzene - 4 - sulfonic acid amide. | 2 - benzoylamino - 5 - hydroxynaphthalene - 1,7 - disulfonic acid. | —H | Cu | Red. |
| 16 | ....do.... | 2 - carbethoxyamino - 5 - hydroxynaphthalene - 1,7 , disulfonic acid. | —H | Cu | Do. |
| 17 | ....do.... | 2 - (2' - carboxy) - benzoylamino - 5 - hydroxynaphthalene - 7 - sulfonic acid. | —H | Cu | Do. |
| 18 | ....do.... | 2 - (4' - amino) - benzoylamino - 5 - hydroxynaphthalene - 7 - sulfonic acid. | —H | Cu | Do. |
| 19 | 1 - hydroxy - 2 - aminobenzene - 4 - sulfonic acid methylamide. | 2 - benzoylamino - 5 - hydroxynaphthalene - 1,7 - disulfonic acid. | —H | Cu | Do. |
| 20 | 1 - hydroxy - 2 - amino - 6 - acetylaminobenzene - 4 - sulfonic acid. | 2 - acetylamino - 5 - hydroxynaphthalene - 7 - sulfonic acid. | —H | Cu | Do. |
| 21 | 1 - hydroxy - 2 - amino - 4 - methylsulfonylbenzene. | 2 - benzoylamino - 5 - hydroxynaphthalene - 7 - sulfonic acid. | —H | Ni | Do. |
| 22 | 1 - hydroxy - 2 - aminobenzene - 4 - sulfonic acid - (2' - hydroxy) - ethylamide. | ....do.... | —H | Cu | Do. |
| 23 | 1 - hydroxy - 2 - aminobenzene - 4 - sulfonic acid phenylamide. | 2 - carbethoxyamino - 5 - hydroxynaphthalene - 1,7 - disulfonic acid. | —H | Cu | Do. |
| 24 | 1 - hydroxy - 2 - amino - 6 - benzoylaminobenzene - 4 - sulfonic acid. | ....do.... | —H | Cu | Do. |
| 25 | 1 - hydroxy - 2 - aminobenzene - 4 - sulfonic acid dimethylamide. | ....do.... | —H | Cu | Do. |
| 26 | 1 - hydroxy - 2 - aminobenzene - 4 - sulfonic acid - (N - methyl) - phenylamide. | 2 - acetylamino - 5 - hydroxynaphthalene - 1,7 - disulfonic acid. | —H | Cu | Do. |
| 27 | 1 - hydroxy - 2 - aminobenzene. | 2 - carbethoxyamino - 5 - hydroxynaphthalene - 1,7 - disulfonic acid. | —H | Cu | Do. |
| 28 | ....do.... | 2 - (4' - amino) - benzoylamino 5 - hydroxynaphthalene - 1,7 - disulfonic acid. | —H | Cu | Do. |
| 29 | ....do.... | 2 - sulfoacetylamino - hydroxynaphthalene - 7 - sulfonic acid. | —CH$_3$ | Cu | Do. |
| 30 | 1 - hydroxy - 2 - aminobenzene - 4 - sulfonic acid. | 5 - hydroxy - 7 - sulfonaphthyl (2) - carbamic acid - (4' - acetylamino) - phenylamide. | —H | Cu | Do. |
| 31 | 1 - hydroxy - 2 - amino - 6 - chlorobenzene - sulfonic acid. | ....do.... | —H | Ni | Do. |
| 32 | 1 - hydroxy - 2 - aminobenzene - 4 - sulfonic acid. | 5 - hydroxy - 7 - sulfonaphthyl (2) - carbamic acid-benzylamide. | —H | Cu | Do. |
| 33 | ....do.... | 5 - hydroxy - 7 - sulfonaphthyl(2) - carbamic acid-phenylamide. | —H | Cu | Do. |
| 34 | ....do.... | 5 - hydroxy - 7 - sulfonaphthyl(2) - carbamic acid - (4' - butyrylamino) - phenylamide. | —H | Cu | Do. |
| 35 | ....do.... | 5 - hydroxy - 7 - sulfonaphthyl(2) - carbamic acid-cyclohexylamide. | —H | Cu | Do. |

The following is a formula of a representative product of the foregoing examples:

EXAMPLE 7

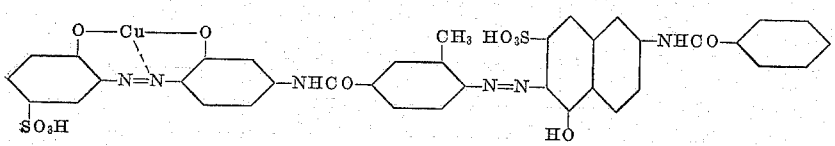

EXAMPLE 36

The copper-containing disazo dyestuff described in Example 1 can also be obtained by subjecting the 51.2 parts of the monosodium salt of the aminomonoazo dyestuff employed in Example 1 to demethylating coppering according to the data of Example 1, then diazotizing the resultant copper complex compound and combining the product, in the presence of excess sodium carbonate with an aqueous solution of 32 parts of the sodium salt of 2-acetylamino - 5 - hydroxynaphthalene - 7 - sulfonic acid. The thus-obtained copper-containing disazo dyestuff is salted out, filtered off and dried.

EXAMPLE 37

A neutral suspension, cooled to a temperature of 8–10°, of the diazomonoazo intermediate obtained by the coupling of 28.5 parts of tetrazotized 1-(4' - amino-3' - methyl)-benzoylamino - 4 - aminobenzene - 3 - carboxylic acid with 33.3 parts of the sodium salt of 2-carbethoxyamino-5- hydroxynaphthalene-7-sulfonic acid, is poured in the course of one hour into a solution, heated to 30°, of 19 parts of 1-phenyl-3-methyl-5-pyrazolone, 17 parts of aqueous sodium hydroxide solution of 30% strength, 300 parts of pyridine and 500 parts of water. The formed disazo dyestuff separates out and is filtered off, washed and dried. It corresponds to the formula

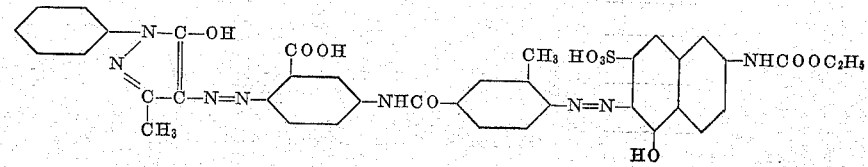

and dyes cotton by the aftercoppering process in scarlet shades of good fastness to light and washing.

The aforementioned diazomonoazo suspension is obtained by stirring 28.5 parts of 1-(4'-amino-3'-methyl)-benzoylamino - 4 - aminobenzene - 3 - carboxylic acid into 800 parts of ice water, adding 50 parts of hydrochloric acid of 30% strength to the resultant suspension, and then at 0° adding 46 parts of aqueous sodium nitrite solution of 30% strength. A solution of 33.3 parts of the sodium salt of 2-carbethoxyamino-5-hydroxynaphthalene - 7 - sulfonic acid in 400 parts of water is run into the tetrazo solution, the temperature of the coupling mass adjusted to 8 to 10°, and then within the course of one hour approximately 20 parts of sodium bicarbonate added thereto portionwise. After the resultant mass has been adjusted to neutrality, stirring is continued for two more hours at 8–10°. Coupling takes place only at the diazo group situated on the benzoyl radical. The resultant diazomonoazo compound separates in the form of orange-red crystals.

EXAMPLE 38

The neutral suspension of the diazomonoazo intermediate obtained according to the second paragraph of Example 37 is run in the course of 1 hour into a solution of 27.5 parts of 1-phenyl-3-methyl-5-pyrazolone-3'-sulfonic acid, 10 parts of sodium carbonate, 300 parts of pyridine and 500 parts of water at 30°. The disazo dyestuff thus formed is precipitated while still warm by means of sodium chloride and then filtered off. For converting into the copper complex compound, the humid filter cake is first dissolved together with 25 parts of crystalline sodium acetate in 1500 parts of water at 80–85°. Then a 20% copper sulfate solution is added dropwise until copper ions can be detected in the filtrate of a salted-out sample. The resulting copper-containing disazo dyestuff is precipitated as a sodium salt by the agency of sodium chloride, and subsequently filtered off and dried. It dyes cotton and fibers of regenerated cellulose in red shades of good fastness to light and washing. The washing fastness of the dyeings is enhanced by after-treatment with copper salts on the fiber.

Table 2 sets forth additional disazo dyestuffs which can be prepared after the manner set forth in Example 37 and which possess properties similar to those of the product of Example 37. These disazo dyestuffs correspond in the copper-free form to the formula

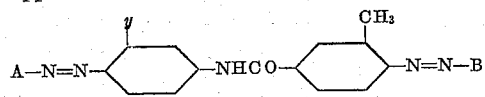

(VII)

wherein symbols A and B represent the radicals enumerated in the table and $y$ represents the substituents therein set forth. The copper-containing disazo dyestuff of Example 59 is prepared according to the method described in Example 38.

*Table 2*

| Example No. (1) | A=Radical of— (2) | B=Radical of— (3) | $y=$ (4) | Use as (5) | Shade on Cotton, Coppered (6) |
|---|---|---|---|---|---|
| 39 | 1-(4'-hydroxy)-phenyl-3-methyl-5-pyrazolone-3'-carboxylic acid. | 2- carbethoxyamino-5-hydroxy-naphthalene-7-sulfonic acid. | —COOH | Aftercoppering dyestuff. | Scarlet red. |
| 40 | 3-methyl-5-pyrazolone | 2-benzoylamino-5-hydroxynaphthalene-1,7-disulfonic acid. | —COOH | do | Do |
| 41 | 1-[4'-(4''-amino)-phenyl]-phenyl-3-methyl-5-pyrazolone. | do | —COOH | do | Do. |
| 42 | 1-[4'-(4''-acetylamino)-phenyl]-phenyl-3-methyl-5-pyrazolone-2'-sulfonic acid. | do | —COOH | do | Do. |
| 43 | 1-phenyl-3-methyl-5-pyrazolone-3'-sulfonic acid amide. | 2-acetylamino-5-hydroxynaphthalene-7-sulfonic acid. | —COOH | do | Do. |
| 44 | 1-(4'-chloro)-phenyl-3-methyl-5-pyrazolone. | 2-acetylamino-5-hydroxynaphthalene-1,7-disulfonic acid. | —COOH | do | Do. |
| 45 | 1-(3'-chloro)-phenyl-3-methyl-5-pyrazolone. | 2-carbethoxyamino-5-hydroxy-naphthalene-1,7-disulfonic acid. | —COOH | do | Do. |
| 46 | 1-phenyl-3-methyl-5-pyrazolone-3'-sulfonic acid. | 2-benzoylamino-5-hydroxynaphthalene-7-sulfonic acid. | —COOH | do | Do. |
| 47 | 1-phenyl-3-methyl-5-pyrazolone-4'-sulfonic acid. | do | —COOH | do | Do. |
| 48 | 1,3-dihydroxybenzene-4-carboxylic acid. | 1-chloro-2-carbethoxyamino-5-hydroxynaphthalene-7-sulfonic acid. | —COOH | do | Brown-red. |
| 49 | 2-acetylamino-5-hydroxynaphthalene-7-sulfonic acid. | 2-acetylamino-5-hydroxynaphthalene-7-sulfonic acid. | —COOH | do | Ruby-red. |
| 50 | 2 - carbethoxyamino - 5 - hydroxy-naphthalene-7-sulfonic acid. | do | —COOH | do | Do. |
| 51 | 2-(3'-methyl-4'-amino)-benzoyl-amino-5-hydroxynaphthalene-7-sulfonic acid. | do | —COOH | do | Do. |
| 52 | 1-hydroxynaphthalene-4-sulfonic acid. | do | —COOH | do | Bordeaux-red. |
| 53 | do | 2-benzoylamino-5-hydroxynaphthalene-7-sulfonic acid. | —COOH | do | Do. |
| 54 | 2 - hydroxynaphthalene - 4 - sulfonic acid. | do | —COOH | do | Do. |
| 55 | 1 - hydroxynaphthalene - 3,8 - disulfonic acid. | 2 - (2' - chloro) - benzoylamino - 5 - hydroxynaphthalene-7-sulfonic acid. | —COOH | do | Do. |
| 56 | 2-hydroxynaphthalene | 2 - carbethoxyamino - 5 - hydroxy-naphthalene-1,7-disulfonic acid. | —COOH | do | Ruby-red. |
| 57 | 2 - hydroxynaphthalene - 3 - carboxylic acid amide. | do | —COOH | do | Do. |
| 58 | 2-benzoylamino-5-hydroxynaphthalene-7-sulfonic acid. | do | —COOH | do | Do. |
| 59 | 2-benzoylamino-5-hydroxynaphthalene-1,7-disulfonic acid. | do | —COOH | Copper complex. | Do. |
| 60 | 2-benzoylamino-5-hydroxynaphthalene-7-sulfonic acid. | 2 - sulfoacetylamino - 5 - hydroxy-naphthalene-7-sulfonic acid. | —COOH | Aftercoppering dyestuff. | Do. |
| 61 | 2 - acetylamino - 5 - hydroxynaphthalene-7-sulfonic acid. | 2-benzoylamino-5-hydroxynaphthalene-1,7-disulfonic acid. | —OH | do | Bordeaux-red. |
| 62 | 2-(4'-fumarylamino)-benzoylamino-5-hydroxynaphthalene-7-sulfonic acid. | do | —OH | do | Do. |
| 63 | 1-phenyl-3-methyl-5-pyrazolone-3'-sulfonic acid. | 5 - hydroxy-7-sulfonaphthyl (2) - carbamic acid-(4'-acetylamino)-phenylamide. | —COOH | do | Scarlet-red. |
| 64 | 1-phenyl-3-methyl-5-pyrazolone-3'-sulfonic acid-methylamide. | 5-hydroxy-7-sulfonaphthyl(2)-carbamic acid-propylamide. | —COOH | do | Do. |

| Example No. (1) | A = Radical of— (2) | B = Radical of— (3) | y = (4) | Use as (5) | Shade on Cotton, Coppered (6) |
|---|---|---|---|---|---|
| 65 | 2-acetylamino-5-hydroxynaphthalene-7-sulfonic acid. | 5-hydroxy-7-sulfonaphthyl (2)-carbamic acid-methylamide. | —COOH | Aftercoppering dyestuff. | Scarlet-red. |
| 66 | 1-hydroxynaphthalene-3,8-disulfonic acid. | 5-hydroxy-7-sulfonaphthyl (2)-carbamic acid-(4'-benzoylamino)-phenylamide. | —COOH | do | Bordeaux red. |
| 67 | do | 5-hydroxy-7-sulfonaphthyl (2)-carbamic acid-(4'-phenyl)-phenylamide. | —COOH | do | Do. |
| 68 | 2-benzoylamino-5-hydroxynaphthalene-7-sulfonic acid. | 5-hydroxy-7-sulfonaphthyl (2)-carbamic acid-amide. | —OH | do | Do. |
| 69 | 1-phenyl-3-methyl-5-pyrazolone-3'-sulfonic acid-methylamide. | 2-crotonylamino-5-hydroxynaphthalene-7-sulfonic acid. | —COOH | do | Scarlet-red. |
| 70 | 3-phenyl-5-pyrazolone. | 2-acetylamino-5-hydroxynaphthalene-7-sulfonic acid. | —COOH | do | Do. |
| 71 | 1-phenyl-3-methyl-5-pyrazolone-3'-sulfonic acid. | do | —OCH₃ | do | Do. |
| 72 | do | | COOH —COOH | do | Yellow. |
| 73 | 2-acetylamino-5-hydroxynaphthalene-7-sulfonic acid. | 4-acetoacetylamino-4'-nitrostilbene-2,2'-disulfonic acid. 1-hydroxy-4-phenylbenzene | —COOH | do | Red. |
| 74 | do | acetoacetylaminobenzene | —COOH | do | Do. |
| 75 | 2-benzoylamino-5-hydroxynaphthalene-7-sulfonic acid. | 1-phenyl-3-methyl-5-pyrazolone-3'-sulfonic acid-methylamide. | —COOH | do | Do. |

The following is a formula of a representative product of the foregoing examples:

EXAMPLE 43

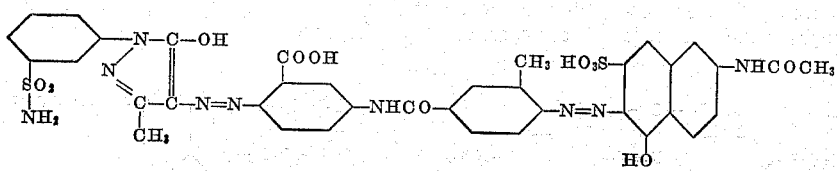

and dyes cotton and fibers of regenerated cellulose by the aftercoppering process in red shades of good fastness to light and to washing.

EXAMPLE 76

40.4 parts of the aminomonoazo dyestuff—prepared by coupling diazotized 2-amino-5-nitrobenzene-1-carboxylic acid with 1-hydroxy-4-methylbenzene, reducing the nitro group to the amino group, acylating the obtained aminomonoazo compound with 3-methyl-4-nitrobenzene-1-carboxylic acid chloride and again reducing the nitromonoazo compound to the aminomonoazo dyestuff—are dissolved in the presence of sodium hydroxide in 1000 parts of water, diazotized after the manner set forth in Example 1, and coupled in the presence of sodium carbonate with an aqueous solution of 42.3 parts of 2-benzoylamino-5-hydroxynaphthalene-1,7-disulfonic acid and 26.3 parts of an aqueous sodium hydroxide solution of 30% strength. The disazo dyestuff is precipitated from the warm reaction solution by means of sodium chloride and is then filtered off and dried. It corresponds to the formula Table 3 sets forth additional disazo dyestuffs which can be prepared after the manner described in Example 76 and which possess properties similar to those of the product described in Example 76. These disazo dyestuffs correspond in the copper-free form to the formula

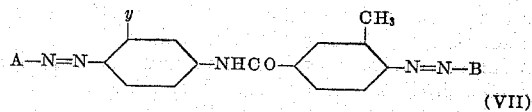

(VII)

wherein symbols A and B represent the radicals enumerated in the table and y represents the substituents therein set forth.

The metal-containing disazo dyestuffs of Examples 83, 84, 87 and 88 are prepared according to the method given in Example 38, whereby, in the case of nickeling, the copper sulfate used in this example is replaced by nickel sulfate.

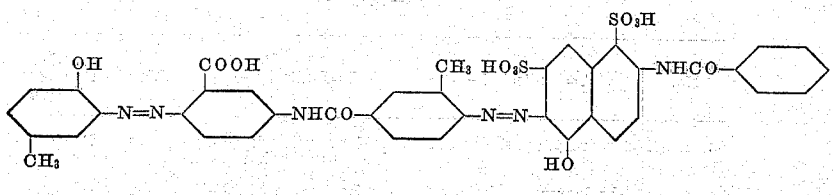

and dissolves with yellowish red coloration in water and with bluish red coloration in concentrated sulfuric acid

Table 3

| Example No. (1) | A = Radical of— (2) | B = Radical of— (3) | y = (4) | Use as (5) | Shade on Cotton, Coppered (6) |
|---|---|---|---|---|---|
| 77 | 1-methyl-4-hydroxybenzene | 2-carbethoxyamino-5-hydroxy-naphthalene-7-sulfonic acid. | —COOH | Aftercoppering dyestuff. | Red. |
| 78 | ----do---- | 2-acetylamino-5-hydroxynaph-thalene-7-sulfonic acid. | —COOH | ----do---- | Do. |
| 79 | ----do---- | 2-benzoylamino-5-hydroxynaph-thalene-7-sulfonic acid. | —COOH | ----do---- | Do. |
| 80 | ----do---- | 2-(4'-amino)-benzoylamino-5-hydroxynaphthalene-7-sulfonic acid. | —COOH | ----do---- | Do. |
| 81 | 1,3-dimethyl-4-hydroxybenzene | 2-carbethoxyamino-5-hydroxy-naphthalene-7-sulfonic acid. | —COOH | ----do---- | Do. |
| 82 | ----do---- | 2-benzoylamino-5-hydroxynaph-thalene-1,7-disulfonic acid. | —COOH | ----do---- | Do. |
| 83 | 1-methyl-4-hydroxybenzene | 2-carbethoxyamino-5-hydroxy-naphthalene-1,7-disulfonic acid. | —COOH | Copper complex. | Do. |
| 84 | ----do---- | 2-sulfoacetylamino-5-hydroxy-naphthalene-7-sulfonic acid. | —COOH | ----do---- | Do. |
| 85 | ----do---- | 2-benzoylamino-5-hydroxynaph-thalene-7-sulfonic acid. | —OH | Aftercoppering dyestuff. | Bluish-red. |
| 86 | ----do---- | 2-acetylamino-5-hydroxynaph-thalene-7-sulfonic acid. | —OH | ----do---- | Do. |
| 87 | ----do---- | 2-sulfoacetylamino-5-hydroxy-naphthalene-7-sulfonic acid. | —OH | Nickel complex. | Do. |
| 88 | 1,3-dimethyl-4-hydroxybenzene | 2-carbethoxyamino-5-hydroxy-naphthalene-1,7-disulfonic acid. | —OH | ----do---- | Do. |
| 89 | ----do---- | 5-hydroxy-7-sulfonaphthyl(2)-carbamic acid-(4'-acetylamino)-phenylamide. | —OH | Aftercoppering dyestuff. | Bordeaux-red. |
| 90 | 1-methyl-4-hydroxybenzene | ----do---- | —COOH | ----do---- | Yellow-red. |
| 91 | 2-hydroxynaphthalene | 5-hydroxy-7-sulfonaphthyl(2)-carbamic acid-methylamide. | —COOH | ----do---- | Bordeaux-red. |

EXAMPLE 92

58.6 parts of the aminomonoazo dyestuff—obtained by coupling diazotized 1-methoxy-2-amino-5-nitrobenzene-4-sulfonic acid with 2-hydroxynaphthalene-4-sulfonic acid, reducing the nitro group to the amino group, acylating the resultant aminoazo compound with 3-methyl-4-nitrobenzene-1-carboxylic acid chloride and again reducing the nitro group to the amino group—are dissolved in 1200 parts of water with the aid of 15 parts of sodium carbonate. To the resultant solution there is then added a solution of 7.5 parts of sodium nitrite in 50 parts of water and the mixture is then rapidly acidified with 50 parts of hydrochloric acid of 30% strength, while stirring at a temperature of 5–10°. After stirring for three hours at 10–15° the diazotization is ended. The diazo suspension is combined with a solution of 32 parts of 2-carbethoxyamino-5-hydroxynaphthalene-7-sulfonic acid, excess sodium carbonate and 400 parts of water. The new disazo dyestuff forms instantaneously. It is precipitated from the warm coupling solution by means of sodium chloride and is then filtered off and dried.

90 parts of the disazo dyestuff are converted into the copper complex compound after the manner described in Example 1. The thus-obtained copper complex compound corresponds to the formula

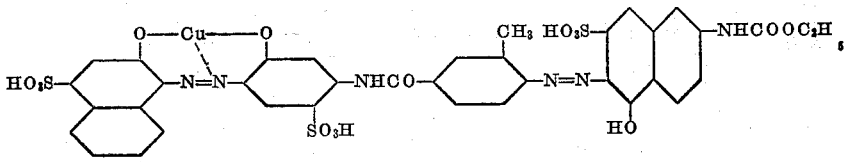

and dyes wool and fibers of regenerated cellulose in bordeaux-red shades of good fastness to light and to washing.

Table 4 sets forth additional metal-containing disazo dyestuffs which can be prepared after the manner set forth in Example 92 (nickeling as set forth in Example 2). They possess properties similar to those of the product of Example 92. These dyestuffs correspond in the unmetallized state to the formula

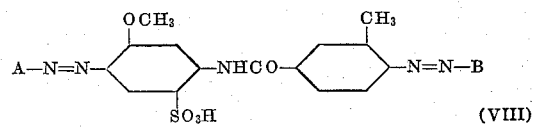

wherein symbols A and B represent the radicals enumerated in the table.

Table 4

| Example No. | A = Radical of— | B = Radical of— | Metal | Shade of Dyeing on Cotton |
|---|---|---|---|---|
| 93 | 2-hydroxynaphthalene | 2-sulfoacetylamino-5-hydroxynaphthalene-7-sulfonic acid. | Cu | Bordeaux-red. |
| 94 | 2-hydroxynaphthalene-4-sulfonic acid. | 2-carbethoxyamino-5-hydroxynaphthalene-1,7-disulfonic acid. | Cu | Do. |
| 95 | ----do---- | 2-acetylamino-5-hydroxynaphthalene-7-sulfonic acid. | Ni | Do. |

| Example No. | A = Radical of— | B = Radical of— | Metal | Shade of Dyeing on Cotton |
|---|---|---|---|---|
| 96 | 2-hydroxynaphthalene-4-sulfonic acid. | 2-(4'-fumarylamino)-benzoylamino-5-hydroxynaphthalene-7-sulfonic acid. | Cu | Bordeaux-red. |
| 97 | ....do.... | 2-fumarylamino-5-hydroxynaphthalene-7-sulfonic acid. | Cu | Do. |
| 98 | ....do.... | 2-(2'-carboxy)-benzoylamino-5-hydroxynaphthalene-7-sulfonic acid. | Ni | Do. |
| 99 | 2-hydroxynaphthalene-6-sulfonic acid. | 2-benzoylamino-5-hydroxynaphthalene-7-sulfonic acid. | Cu | Do. |
| 100 | 1-hydroxynaphthalene-4-sulfonic acid. | 2-carbethoxyamino-5-hydroxynaphthalene-1,7-disulfonic acid. | Cu | Do. |
| 101 | 2-acetylamino-5-hydroxynaphthalene-7-sulfonic acid. | ....do.... | Cu | Do. |
| 102 | 2-(4'-fumarylamino)-benzoylamino-5-hydroxynaphthalene-7-sulfonic acid. | ....do.... | Cu | Do. |
| 103 | 1-methyl-4-hydroxybenzene. | ....do.... | Cu | Red. |

EXAMPLE 104

42.6 parts of the aminomonoazo dyestuff of the formula

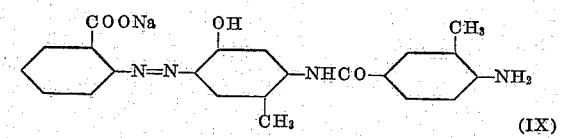

(IX)

are diazotized after the manner described in Example 1 and are combined in the presence of excess sodium carbonate with an aqueous solution of 48 parts of 2-benzoylamino-5-hydroxynaphthalene-1,7-disulfonic acid sodium salt. The resultant diazo dyestuff separates out in crystalline form. It is filtered off with the aid of suction and is dried. It corresponds to the formula

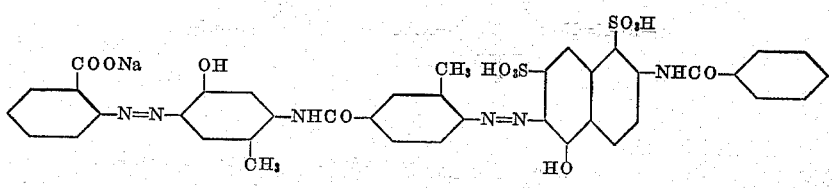

and is a dark powder which dissolves with red coloration in water and with bluish red coloration in concentrated sulfuric acid. It dyes cotton and fibers of regenerated cellulose by the aftercoppering process in red shades of good fastness to light and to washing.

EXAMPLE 105

A product similar to the disazo dyestuff described in Example 104 is obtained when, while otherwise proceeding according to the process outlined in the said example, the azo component there employed is replaced by the corresponding quantity of the 2-(4'-amino)-benzoylamino-5-hydroxynaphthalene-1,7-disulfonic acid sodium salt.

EXAMPLE 106

If, while otherwise proceeding according to Example 104, the 48 parts of 2-benzoylamino-5-hydroxynaphthalene-1,7-disulfonic acid sodium salt are replaced by the equivalent quantity of the 2-(4'-amino-3'-methyl)-benzoylamino-5-hydroxynaphthalene-7-sulfonic acid sodium salt, a copperable disazo dyestuff with similar properties is obtained.

EXAMPLE 107

51.4 parts of the aminomonoazo dyestuff of the formula

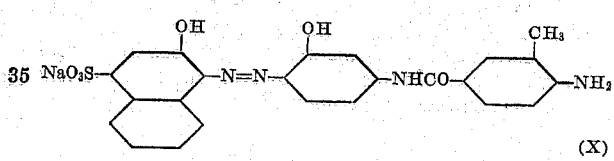

(X)

are diazotized after the manner described in Example 1.

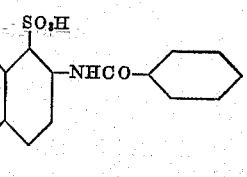

The diazo suspension is combined in the presence of excess sodium carbonate with an aqueous solution of 30.3 parts of the sodium salt of 2-acetylamino-5-hydroxynaphthalene-7-sulfonic acid. The new disazo dyestuff forms instantaneously. It is precipitated from the warm coupling solution by means of sodium chloride and is then filtered off and dried.

In order to convert the said dyestuff into its copper complex compound, 82.8 parts of the disodium salt of the disazo dyestuff and 27 parts of crystalline sodium acetate are dissolved in 2000 parts of water. To the resultant solution, there is gradually added at 80–85° an aqueous solution containing 25 parts of crystalline copper sulfate. The mass is then kept at a temperature of 80–85° during half an hour. The thus-prepared copper-containing disazo dyestuff is precipitated by means of sodium chloride and is then filtered off and dried. It corresponds to the formula

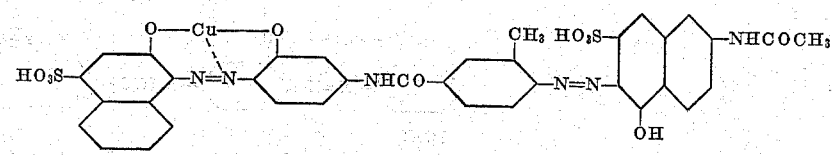

and dyes cotton and fibers of regenerated cellulose in bordeaux-red shades with good fastness to light and to washing.

EXAMPLE 108

0.1 part of the disazo dyestuff obtained according to Example 76 is dissolved in 300 parts of water. 10 parts of prewetted cotton cloth are dyed in this bath, which is initially at a temperature of approximately 30° and is heated to boiling in the course of thirty minutes and finally maintained at boiling temperature for fifteen minutes. In the course of the dyeing process, 3–4 parts of anhydrous sodium sulfate in the form of a 10% aqueous solution are added portionwise to the bath. The dyed material is then permitted to cool in the bath at 50° in the course of 15–20 minutes after which it is rinsed with water and subjected to an aftertreatment with copper sulfate or with a cation-active copper complex compound which, if desired, may be basic.

EXAMPLE 109

Disazo deystuffs according to the present invention, which are coppered in substance, may also be used for dyeing cotton cloth after the manner described in the preceding example. In this case, however, an aftertreatment with copper sulfate is superfluous.

Also the disazo dyestuffs which are nickeled in substance, are dyed in the same manner, an aftertreatment of the dyeings being superfluous.

Having thus disclosed the invention, what is claimed is:

1. A member selected from the group consisting of a disazo dyestuff and the copper and nickel complex compounds thereof, which dyestuff corresponds in the metal-free form to the formula

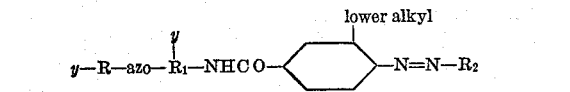

wherein one $y$ stands for —OH, the other $y$ being a member selected from the group consisting of —OH, —OCH$_3$, —OCH$_2$COOH and —COOH, $y$—R stands for a radical selected from the group consisting of a radical of the benzene, naphthalene and pyrazolone series, the $y$ of $y$—R being in ortho-position to -azo-, $y$—R$_1$ stands for a radical of the benzene series, the $y$ of $y$—R$_1$ being in ortho-position to -azo-, and wherein R$_2$ stands for a radical selected from the group consisting of hydroxybenzene, hydroxynaphthalene, enolic pyrazolone and enolic β-ketocarboxylic arylamide radicals.

2. A disazo dyestuff which corresponds in the metal-free form to the formula

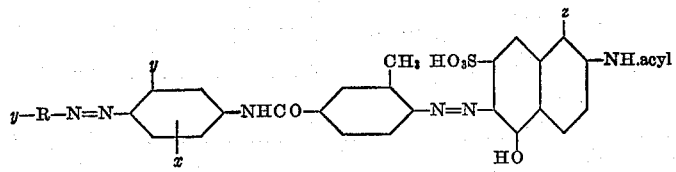

wherein $x$ stands for a member selected from the group consisting of hydrogen, methyl, methoxy and —SO$_3$H, one $y$ stands for —OH, the other $y$ being a member selected from the group consisting of —OH, —OCH$_3$, —OCH$_2$COOH and —COOH, $z$ stands for a member selected from the group consisting of hydrogen, chlorine and —SO$_3$H, acyl is a carboxylic acid acyl group, and $y$—R stands for a radical selected from the group consisting of a radical of the benzene, naphthalene and pyrazolone series, the $y$ of $y$—R being in ortho-position to the respective azo group.

3. The copper complex compound of a disazo dyestuff which corresponds in the metal free form to the formula

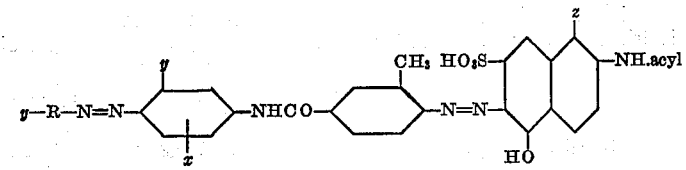

wherein $x$ stands for a member selected from the group consisting of hydrogen, methyl, methoxy and —SO$_3$H, one $y$ stands for —OH, the other $y$ being a member selected from the group consisting of —OH, —OCH$_3$, —OCH$_2$COOH and —COOH, $z$ stands for a member selected from the group consisting of hydrogen, chlorine and —SO$_3$H, acyl is a carboxylic acid acyl group, and $y$—R stands for a radical selected from the group consisting of a radical of the benzene, naphthalene and pyrazolone series, the $y$ of $y$—R being in ortho-position to the respective azo group.

4. The disazo dyestuff which corresponds to the formula

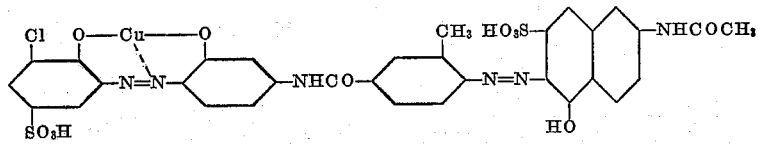

5. The disazo dyestuff which corresponds to the formula

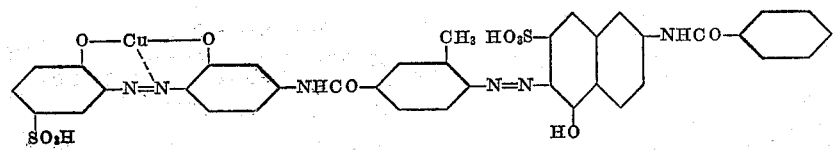

6. The disazo dyestuff which corresponds to the formula
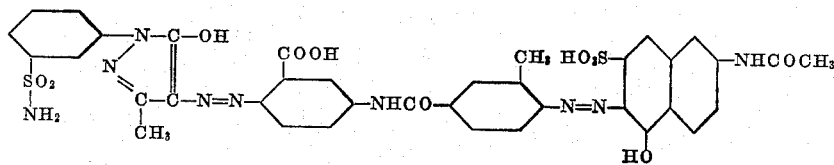
7. The disazo dyestuff which corresponds to the formula
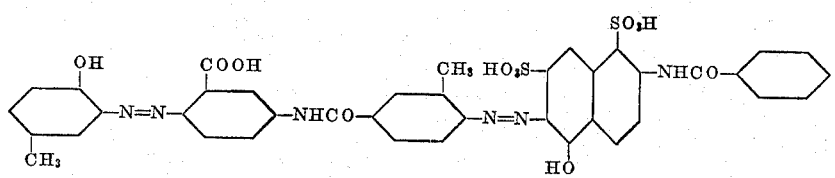
8. The disazo dyestuff which corresponds to the formula
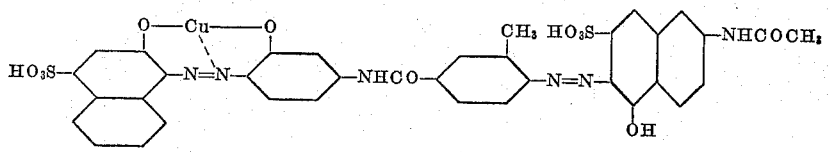
References Cited in the file of this patent
UNITED STATES PATENTS
| | | |
|---|---|---|
| 2,544,087 | Hindermann | Mar. 6, 1951 |
| 2,623,873 | Ischer | Dec. 20, 1952 |
FOREIGN PATENTS
| | | |
|---|---|---|
| 285,140 | Switzerland | Dec. 16, 1952 |